(12) United States Patent
Chen et al.

(10) Patent No.: US 8,643,349 B2
(45) Date of Patent: Feb. 4, 2014

(54) POWER SUPPLY CONTROLLER AND METHOD

(75) Inventors: Gang Chen, Hong Kong (CN); Xin Zhang, San Jose, CA (US); Weiyun Chen, Gilbert, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 737 days.

(21) Appl. No.: 12/614,532

(22) Filed: Nov. 9, 2009

(65) Prior Publication Data

US 2011/0109363 A1    May 12, 2011

(51) Int. Cl.
*G05F 1/00* (2006.01)

(52) U.S. Cl.
USPC .......................................................... 323/282

(58) Field of Classification Search
USPC ........................... 323/282–288, 291, 356, 367
See application file for complete search history.

(56) References Cited

U.S. PATENT DOCUMENTS

| | | | |
|---|---|---|---|
| 6,541,944 B2 * | 4/2003 | Hwang | 323/225 |
| 7,538,532 B2 * | 5/2009 | Hack et al. | 323/284 |
| 7,843,181 B2 * | 11/2010 | Capilla et al. | 323/282 |
| 7,928,705 B2 * | 4/2011 | Hooijschuur et al. | 323/272 |
| 7,982,447 B2 * | 7/2011 | Chellamuthu et al. | 323/285 |
| 8,067,925 B2 * | 11/2011 | Grimm | 323/274 |
| 8,154,268 B2 * | 4/2012 | Philbrick et al. | 323/286 |
| 8,324,756 B2 * | 12/2012 | Dash et al. | 307/31 |
| 2010/0308654 A1 * | 12/2010 | Chen | 307/31 |

* cited by examiner

*Primary Examiner* — Adolf Berhane
*Assistant Examiner* — Yemane Mehari
(74) *Attorney, Agent, or Firm* — Rennie William Dover

(57) ABSTRACT

A power supply controller and method for improving the transient response of the power supply controller. The power supply controller includes a pulse width modulation control module connected to a feedback network. The feedback network is composed of an amplifier having an inverting input terminal, a non-inverting input terminal, and an output terminal. A compensation network is coupled between the inverting input terminal and the output terminal of the amplifier and a reference voltage is coupled to the non-inverting input terminal of the amplifier. A switch is coupled between the output terminal of the amplifier and an input terminal of the compensation network. The transient response of the controller is improved by operating the controller in a closed loop compensation configuration during a continuously pulsing operating mode and in an open loop compensation configuration during a pulse skip operating mode.

20 Claims, 6 Drawing Sheets

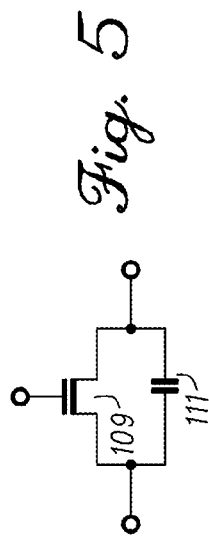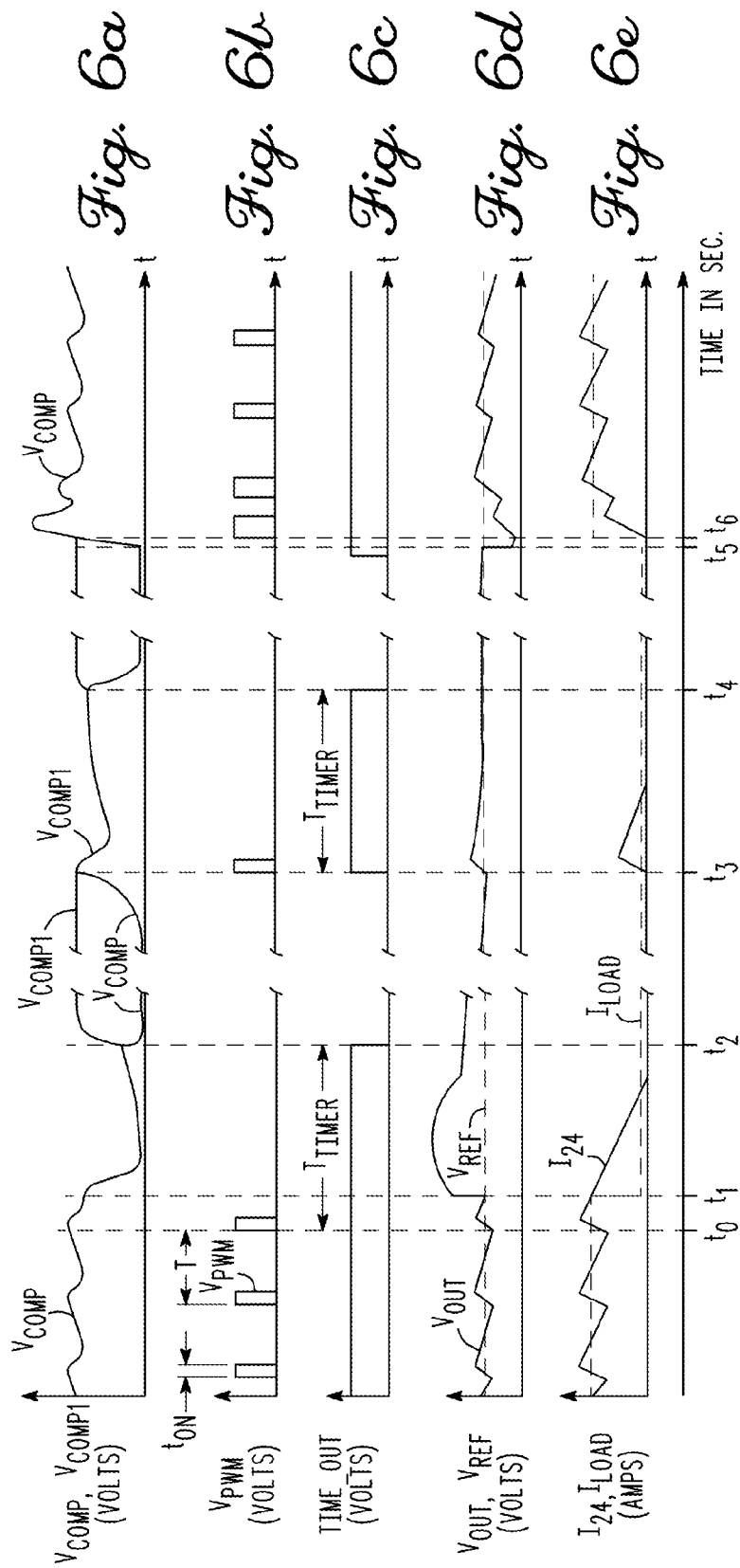

POWER SUPPLY CONTROLLER AND METHOD

TECHNICAL FIELD

The present invention relates, in general, to power supplies and, more particularly, to switching mode power supplies.

BACKGROUND

Switching Mode Power Supplies (SMPS) are used in a variety of portable electronic devices including laptop computers, cellular phones, personal digital assistants, video games, video cameras, etc. They may convert a dc signal at one voltage level to a dc signal at a different voltage level (this is a dc-dc converter), an Alternating Current (ac) signal to a dc signal (this is a an ac-dc converter), a dc signal to an ac signal (this is a dc-ac converter), or an ac signal to an ac signal (this is an ac-ac converter). Generally, switching mode power supplies have included switching power supply controllers or converters that operate in a continuous mode under heavy load conditions, i.e., a load that draws a large current, and under a skip mode or pulse skip mode under light loading conditions, i.e., a load that draws a small current. In the past, semiconductor manufacturers used various methods and structures to form the switching power supply controllers, such as Pulse Width Modulated (PWM) power supply controllers that regulated the value of a voltage supplied by a power supply system. In some cases, the switching power supply controllers were capable of operating in a fixed frequency or continuous operating mode during normal operation. When the current drawn by the load that was receiving power from the power supply system decreased, some of the prior switching power supply controllers operated in a light load mode that skipped some of the PWM cycles. The light load operating mode has been referred to as a skip mode or a burst mode. When the load again required a higher current, the switching regulator circuit exited the skip mode and returned to normal operation.

Usually the converters include a compensation network that is connected to an error amplifier to stabilize the system and to optimize the transient response based on a small signal behavior model. However, when a large signal transient event occurs such as a step load transient from a light load condition to a full load condition, the converter is unable to achieve the desired response due to saturation recovery of the compensation network and the slew rate limitation of an error amplifier.

FIG. 1 is a prior art schematic diagram of a portion of a power supply system 10 that includes a switching power supply controller 12. System 10 receives power between a power input terminal 14 and a power return terminal 16 and forms an output voltage ($V_{OUT}$) between output 18 and terminal 16. Controller 12 is configured to regulate output voltage $V_{OUT}$ to a desired value or target value within a range of values around the target value. For example, the target value may be five volts (5 v) and the range of values may be plus or minus five percent (5%) around the five volts. System 10 usually includes a power switch such as a power transistor 20 and a rectifier 22 that are connected to control an inductor current $I_{24}$ that flows through an inductor 24. Rectifier 22 may be a synchronous Metal Oxide Semiconductor Field Effect Transistor, a diode, or the like. A capacitor 26 is connected between output 18 and terminal 16 in order to assist in forming output voltage $V_{OUT}$. A voltage sense network 28 may be coupled to output 18 to provide a voltage sense signal $V_S$ at node 30 that is representative of the instantaneous value of output voltage $V_{OUT}$. By way of example, voltage sense network 28 is comprised of resistors 32 and 34 having terminals that are commonly connected together to form node 30. In addition resistor 32 has a terminal connected to output 18 and resistor 34 has a terminal connected to power return terminal 16. Voltage sensing network 28 may be any type of sensing network that provides sense signal $V_S$ at node 30 that is representative of the value of output voltage $V_{OUT}$. A load 36 is generally connected between output 18 and terminal 16 in order to receive output voltage $V_{OUT}$ and to receive a load current $I_{LOAD}$. It should be noted that load current $I_{LOAD}$ is the sum of current $I_{24}$ and a current $I_{26}$ that may flow from capacitor 26.

Switching power supply controller 12 receives operating power from a regulator 35 that is connected between a voltage input 38 and a voltage return 40. Input 38 and return 40 typically are connected to respective terminals 14 and 16. It should be noted that regulator 40 may provide reference voltage $V_{REF}$. Controller 12 is configured to form a switching drive signal on an output 42 that is suitable for driving and operating transistor 20 to regulate the value of output voltage $V_{OUT}$. Voltage sense signal $V_S$ from voltage sense network 28 is received by controller 12 on a voltage sense input 44.

Controller 12 includes a PWM control module 50 suitable for generating a PWM switching signal that is input into a buffer driver or buffer 52. Buffer 52 has an output terminal connected to a gate terminal of power transistor 20. Controller 12 further includes a feedback network 54 that comprises an operational amplifier 56 and a compensation network 58. By way of example, compensation network 58 is a passive voltage compensation network. More particularly, operational amplifier 56 serves as an error amplifier that has an inverting input terminal, a non-inverting input terminal, and an output terminal, where the non-inverting input terminal is coupled for receiving a reference voltage $V_{REF}$, the inverting input terminal is coupled to its output terminal and to voltage sense node 44 through compensation network 58. By way of example, compensation network 58 is composed of a resistor 60 connected between the inverting input terminal of operational amplifier 56 and voltage sense node 44, and a resistor capacitor network 62 coupled between the inverting input terminal and the output terminal of operational amplifier 56. Resistor capacitor network 62 is comprised of a capacitor 64 coupled in parallel with a resistor 66 and a capacitor 68 which are connected in series. The output terminal of operational amplifier 56 is directly connected to an input terminal of PWM control module 50.

In operation, power supply system 10 typically operates in one of two operating modes: a continuous operating mode or a pulse skip (or burst) operating mode. Under a heavy or non-light load condition, PWM control module 50 operates at its nominal or full operating frequency and inductor current $I_{24}$ is continuous. Under a light load or a no load condition, load current $I_{LOAD}$ decreases and inductor current $I_{24}$ becomes discontinuous. If the pulse skip mode is enabled, the operating frequency or switching frequency at the output terminal of PWM control module 50 is reduced in response to the decrease in the loading current, thereby reducing power dissipation.

FIGS. 2a, 2b, 2c, and 2d are plots that illustrate various signals that are generated by controller 12 when it operates in a continuous operating mode. The abscissas of plots 2a, 2b, 2c, and 2d indicate time and the ordinates of plots 2a, 2b, and 2c indicate voltage, whereas the ordinate of plot 2d indicates current. More particularly, plot 2a illustrates the voltage $V_{COMP}$ transmitted from the output terminal of operational amplifier 56 to the input terminal of PWM control module 50; plot 2b illustrates output voltage $V_{OUT}$ that appears between output 18 and terminal 16; plot 2c illustrates the voltage $V_{SWN}$ appearing at node 25; and plot 2d illustrates inductor current $I_{24}$. In FIG. 2, controller 12 operates in the continuously pulsing PWM mode, thus inductor current $I_{24}$ is continuous. Under this condition, operational amplifier 56 does not operate in saturation and there is little change in the DC bias of the capacitors of resistor capacitor network 62, i.e., capacitors 64 and 68. More particularly, in the steady state continuously pulsing mode of operation the DC bias across capacitor 68 is substantially equal to the difference between the average voltage level at the output terminal of error amplifier 56 during the continuously pulsing mode of operation and reference voltage $V_{REF}$ that appears at the non-inverting input terminal of error amplifier 56, i.e., $V_{C68} = V_{COMP\_AVG} - V_{REF}$. In the pulse skipping mode, when output voltage $V_{OUT}$ is higher than reference voltage $V_{REF}$, voltage $V_{COMP}$ remains at its minimum level. Under this condition, the DC bias voltage across capacitor 68 is substantially equal to the difference between the minimum voltage value of voltage $V_{COMP}$ and reference voltage $V_{REF}$, i.e., $V_{C68} = V_{COMP\_MIN} - V_{REF}$.

When there is a step-up load transience, voltage $V_{COMP}$ increases to a value that is substantially equal to the average voltage level at the output terminal of error amplifier 56. Because the DC bias voltage across capacitor 68 cannot change instantaneously, a voltage difference substantially equal to $V_{COMP} - V_{C68} - V_{REF}$ is added across resistor 66, which causes a droop current to be injected into node 59 and through resistor 60. Voltage $V_{C68}$ is the voltage across capacitor 68. The additional droop current results in an additional voltage droop and a longer time for output voltage $V_{OUT}$ to recover.

FIGS. 3a, 3b, 3c, and 3d are plots that illustrate various signals that are generated by controller 12 when there is a step-up load transience, the skip mode is enabled, and controller 12 has been operating in the skip mode. The abscissas of plots 3a, 3b, 3c, and 3d indicate time and the ordinates of plots 3a, 3b, and 3c indicate voltage, whereas the ordinate of plot 3d indicates current. More particularly, plot 3a illustrates the voltage $V_{COMP}$ transmitted from the output terminal of operational amplifier 56 to the input terminal of PWM control module 50; plot 3b illustrates the output voltage $V_{OUT}$ appearing between output 18 and terminal 16; plot 3c illustrates the voltage $V_{SWN}$ appearing at node 25; and plot 3d illustrates inductor current $I_{24}$ and load current $I_{LOAD}$.

Because controller 12 went into the skip mode of operation, the system transient response is degraded due to the DC level deviation in feedback network 54.

Accordingly, it would be advantageous to have a method and a power supply controller with a fast transient response under heavy and light loading conditions. It would be of further advantage for the circuit and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which:

FIG. 5 is a circuit schematic of a switch suitable for use with the portion of the power supply control system shown in FIG. 4;

FIG. 6a is a plot that illustrates voltage signals that are generated by the portion of the power supply control system of FIG. 4;

FIG. 6b is a plot that illustrates a voltage signal that is generated by the portion of the power supply control system of FIG. 4;

FIG. 6c is a plot that illustrates a voltage signal that is generated by the portion of the power supply control system of FIG. 4;

FIG. 6d is a plot that illustrates a voltage signal that is generated by the portion of the power supply control system of FIG. 4;

FIG. 6e is a plot that illustrates a current signal that is generated by the portion of the power supply control system of FIG. 4;

DETAILED DESCRIPTION

Generally, the present invention provides a power supply controller having a feedback control switch and a method for compensating an error signal in a feedback network. The power supply controller includes an error amplifier in a feedback path and a switch for opening and closing a feedback loop. The switch acts as an active compensator in the control loop thereby reducing the error amplifier's slew-rate requirement when the controller is operating between a continuously pulsing operating mode and a pulse skip operating mode. In accordance with an embodiment of the present invention, an active switch is inserted in a negative feedback path of an error amplifier. By way of example, the switch is in series with a passive compensation network which provides compensation when the switch is closed and the controller is operating in the continuously pulsing operating mode. When the controller is operating in the pulse skip operating mode, the controller opens the switch allowing passive charge storage elements in the passive compensation network to maintain the charge stored in them. By maintaining the charge, the controller quickly and efficiently returns to its nominal operating state when changing from the pulse skip operating mode to the continuously pulsing operating mode, i.e., after the switch has been closed.

In accordance with another embodiment, the power supply controller, comprises a pulse width modulation control module connected to a compensation network. The compensation network includes an amplifier having an inverting input terminal, a non-inverting input terminal, and an output terminal. A passive compensation network is coupled between the inverting input terminal and the output terminal of the amplifier. A switch is coupled between the output terminal of the amplifier and an input terminal of the compensation network.

In accordance with another embodiment, a method for improving a transient response of a controller comprises generating a feedback signal from a first signal using a compensation network that is in a closed loop configuration and the controller is operating in a continuously pulsing mode. The controller changes the feedback signal when it is operating in a pulse skip operating mode by opening the feedback loop.

It should be noted that the terms light load and heavy load are dependent upon the application and parameters such as the inductance value of inductor 24. For example, in some applications in which the full load current is 10 amps, a light load may be 1 amp; however in some applications in which the full load current is 1 amp, a light load may be 10 milliamps. Accordingly, a load current is considered to be a light load when it is less than about 15 percent of the full load current and a load current is considered to be a heavy load when it is the full load current or a current level that is within about 15 percent of the full load current.

Figure 1:
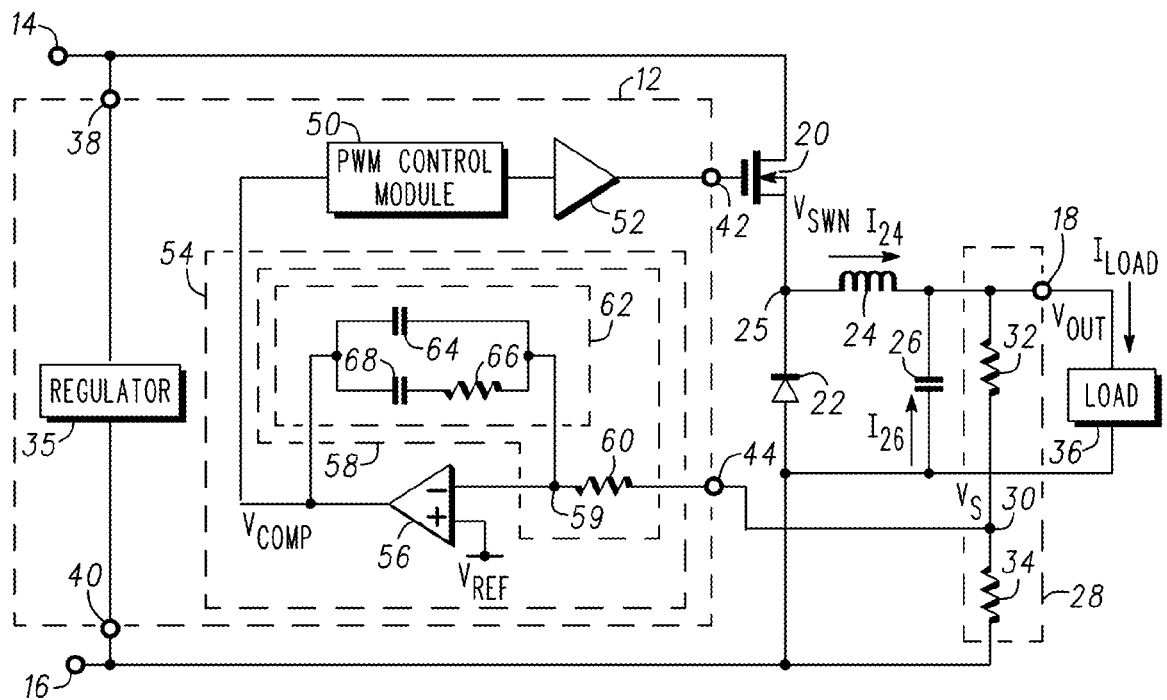
FIG. 1 is a circuit schematic of a prior art portion of a power supply control system.
Figure 2A:
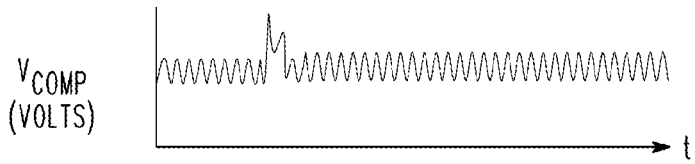
FIG. 2a is a plot that illustrates a voltage signal that is generated by the portion of the prior art power supply control system of FIG. 1 when it operates in a continuously pulsing operating mode.
Figure 2B:
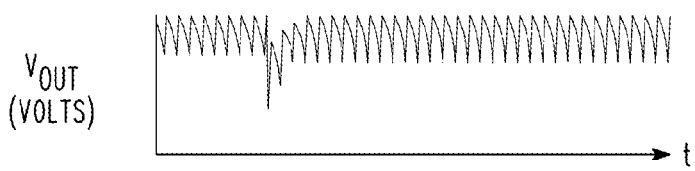
FIG. 2b is a plot that illustrates a voltage signal that is generated by the portion of the prior art power supply control system of FIG. 1 when it operates in a continuously pulsing operating mode.
Figure 2C:
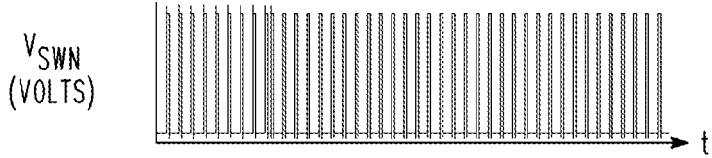
FIG. 2c is a plot that illustrates a voltage signal that is generated by the portion of the prior art power supply control system of FIG. 1 when it operates in a continuously pulsing operating mode.
Figure 2D:
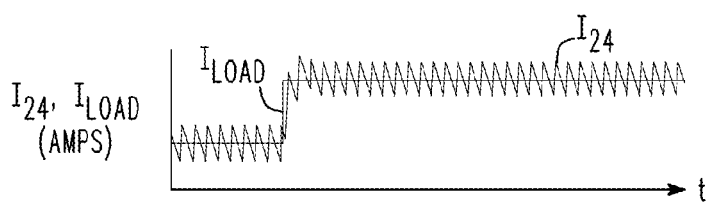
FIG. 2d is a plot that illustrates current signals that are generated by the portion of the prior art power supply control system of FIG. 1 when it operates in a continuously pulsing operating mode.
Figure 3A:
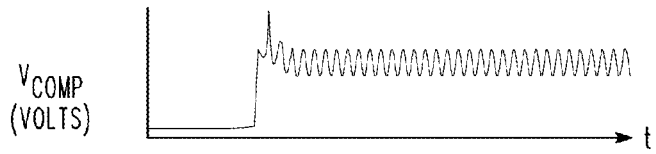
FIG. 3a is a plot that illustrates a voltage signal that is generated by the portion of the prior art power supply control system of FIG. 1 when it operates in a pulse skip mode of operation.
Figure 3B:
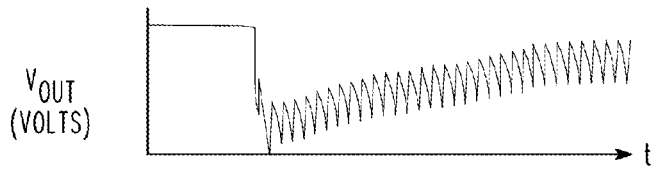
FIG. 3b is a plot that illustrates a voltage signal that is generated by the portion of the prior art power supply control system of FIG. 1 when it operates in a pulse skip mode of operation.
Figure 3C:
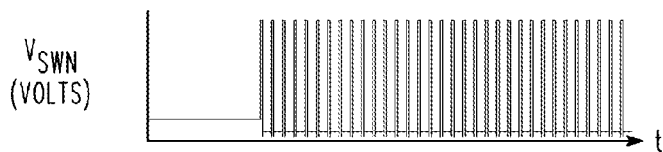
FIG. 3c is a plot that illustrates a voltage signal that is generated by the portion of the prior art power supply control system of FIG. 1 when it operates in a pulse skip mode of operation.
Figure 3D:
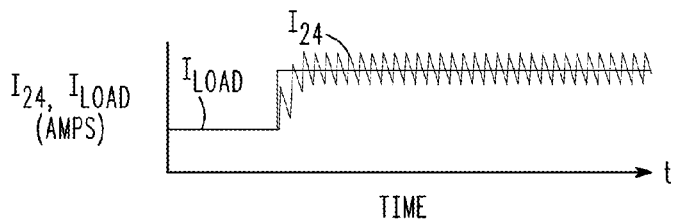
FIG. 3d is a plot that illustrates a current signal that is generated by the portion of the prior art power supply control system of FIG. 1 when it operates in a pulse skip mode of operation.
Figure 4:
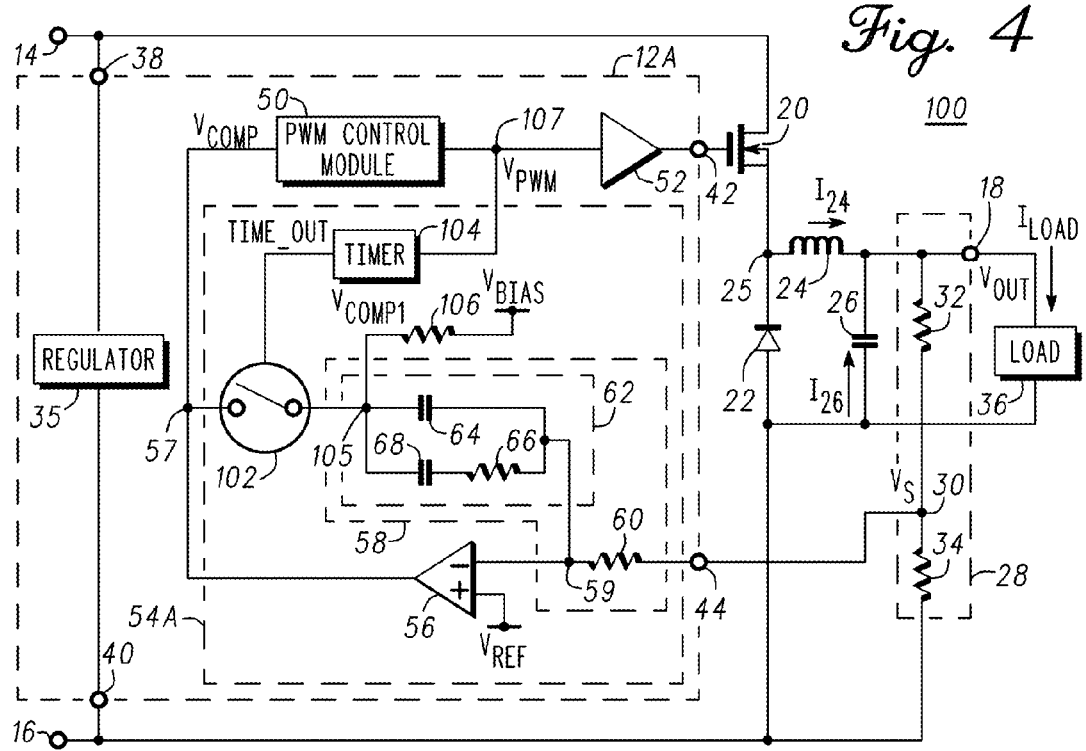
FIG. 4 is a circuit schematic of a portion of a power supply control system in accordance with an embodiment of the present invention.
Figure 7A:
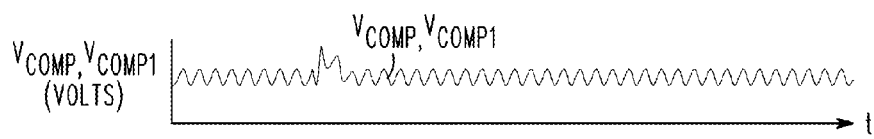
FIG. 7a is a plot that illustrates voltage signals that are generated by the portion of the power supply control system of FIG. 4 when it operates in a continuously pulsing operating mode.
Figure 7B:
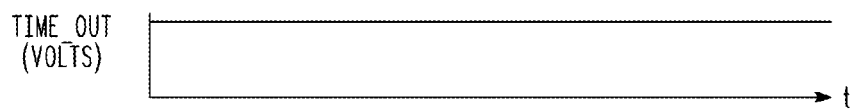
FIG. 7b is a plot that illustrates a voltage signal that is generated by the portion of the power supply control system of FIG. 4 when it operates in a continuously pulsing operating mode.
Figure 7C:
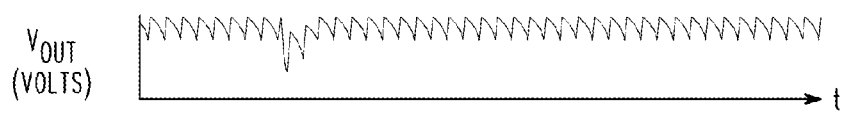
FIG. 7c is a plot that illustrates a voltage signal that is generated by the portion of the power supply control system of FIG. 4 when it operates in a continuously pulsing operating mode.
Figure 7D:
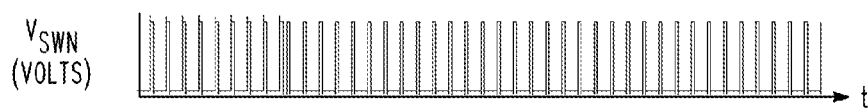
FIG. 7d is a plot that illustrates a voltage signal that is generated by the portion of the power supply control system of FIG. 4 when it operates in a continuously pulsing operating mode.
Figure 7E:
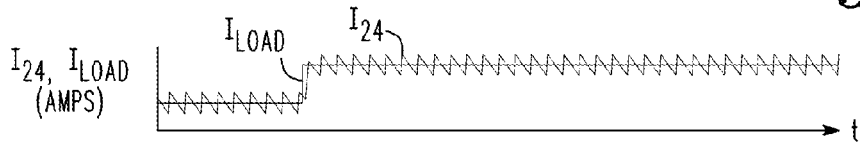
FIG. 7e is a plot that illustrates current signals that are generated by the portion of the power supply control system of FIG. 4 when it operates in a continuously operating mode.
Figure 8A:
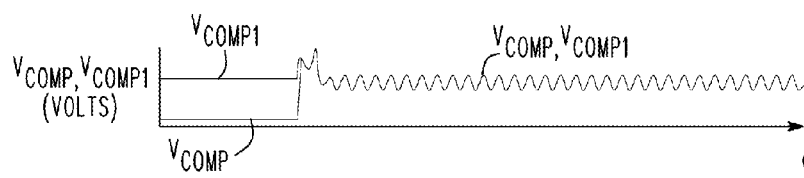
FIG. 8a is a plot that illustrates voltage signals that are generated by the portion of the power supply control system of FIG. 4 when it operates in a pulse skip mode of operation.
Figure 8B:
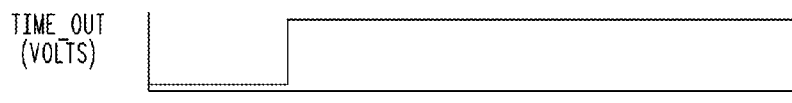
FIG. 8b is a plot that illustrates a voltage signal that is generated by the portion of the power supply control system of FIG. 4 when it operates in a pulse skip mode of operation.
Figure 8C:
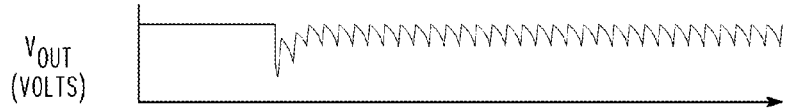
FIG. 8c is a plot that illustrates a voltage signal that is generated by the portion of the power supply control system of FIG. 4 when it operates in a pulse skip mode of operation.
Figure 8D:
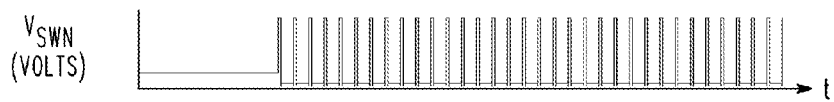
FIG. 8d is a plot that illustrates a voltage signal that is generated by the portion of the power supply control system of FIG. 4 when it operates in a pulse skip mode of operation.
Figure 8E:
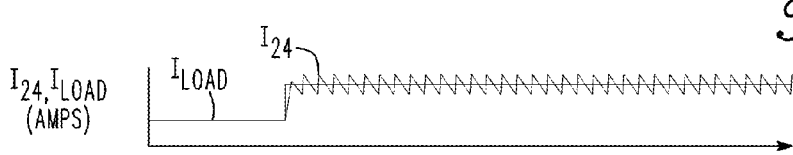
FIG. 8e is a plot that illustrates current signals that are generated by the portion of the power supply control system of FIG. 4 when it operates in a pulse skip mode of operation.

FIG. 4 is a schematic diagram of a portion of a power supply system 100 in accordance with an embodiment of the present invention. Power supply system 100 includes a switching power supply controller 12A, voltage sense network 28, power transistor 20, rectifier 22, and inductor 24. Switching power supply controller 12A is similar to switching power supply controller 12 except that it includes a feedback network 54A that has passive voltage compensation network 58, a switch 102, a timer 104, and a bias voltage $V_{BIAS}$ coupled to capacitors 64 and 68 through a resistor 106. It should be noted that passive voltage compensation network 58 can be a single pole network, i.e., a Type I Network, a two pole, one zero network, i.e., a Type II Network, a three pole, two zero network, i.e., a Type III network, or other compensation network. Terminals of capacitors 64 and 68 are connected together to form a node 105. Switch 102 is connected between node 105, i.e., at the output of compensation network 62, and the commonly connected output terminal of error amplifier 56 and the input terminal of PWM control module 50. The control terminal of switch 102 is coupled to the output terminal of PWM control module 50 through a timer 104. More particularly, the output terminal of PWM control module 50 is connected to the input terminal of timer 104 at node 107 and the output terminal of timer 104 is connected to the control terminal of switch 102. Resistor 106 limits the current flowing between the output terminal of error amplifier 56 and voltage $V_{BIAS}$. Voltage $V_{BIAS}$ may be generated by an adaptive DC voltage generator where voltage $V_{BIAS}$ is close to the DC voltage level of signal $V_{COMP}$ during the steady-state continuous pulsing mode of operation. When PWM control module 50 is a voltage mode PWM controller voltage, voltage $V_{BIAS}$ can determined as follows:

$$V_{BIAS} = G_{VOUT} * V_{OUT} + V_{RAMP}$$

where $G_{VOUT}$ is the ratio of the voltage $V_{BIAS}/V_{OUT}$; and $V_{RAMP}$ is an offset voltage or the valley value of an internal ramp signal of PWM control module 50.

In accordance with an embodiment of the present invention, switch 102 is a transistor such as, for example, a field effect transistor. FIG. 5 illustrates a transistor 109 having a control electrode and current conducting electrodes. It should be noted that the control electrode of transistor 109 is analogous to the control terminal of switch 102, one of the current conducting electrodes is connected to a terminal of passive network 62, and the other current conducting electrode is connected to the input terminal of PWM control module 50. FIG. 5 further illustrates a capacitor 111 coupled between the current conducting terminals of transistor 109. Capacitor 111 may be a parasitic capacitance of transistor 109 or it may be an additional capacitor having a small capacitance value that smoothes the transition from the skip mode of operation to the continuous mode of operation and that provides filtering. By way of example, the capacitance value of capacitor 111 is about one picoFarad.

In operation, timer 104 detects the output signal of PWM control module 50 at node 107 and in response to the output signal generates a control signal for controlling switch 102. Timer 104 starts timing after it has been reset by the signal at node 107. Timer 104 has a timing period that is longer than the switching cycle of the output signal of PWM control module 50 when it is operating in a continuously pulsing or critical conduction mode, i.e., timer 104 generates a time out signal (Time_Out). Time out signal Time_Out remains in a valid state until it is reset. When signal Time_Out is in the valid state, switch 102 is open which opens the feedback loop and when signal Time_Out is in the invalid state switch 102 is closed, which closes the feedback loop. Thus, switch 102 is closed when PWM control module 50 operates in a continuously pulsing mode and is open after it skips one or more pulses.

FIGS. 6a, 6b, 6c, 6d, and 6e are plots that illustrate various signals that are generated by controller 12A in accordance with embodiments of the present invention. The abscissas of plots 6a, 6b, 6c, 6d, and 6e indicate time in seconds and the ordinates of plots 6a, 6b, 6c, and 6d indicate voltage, whereas the ordinate of plot 6e indicates current. More particularly, plot 6a illustrates the voltage $V_{COMP}$ that is transmitted from the output terminal of operational amplifier 56 to the input terminal of PWM control module 50 and voltage signal $V_{COMP1}$ that appears at node 105; plot 6b illustrates voltage $V_{PWM}$ appearing at node 107, i.e., the output terminal of PWM controller 50; plot 6c illustrates signal Time_Out which is transmitted from timer 104 to the control terminal of switch 102; plot 6d illustrates both the output voltage $V_{OUT}$ appearing between output 18 and terminal 16 and reference voltage $V_{REF}$; and plot 6e illustrates inductor current $I_{24}$ and load current $I_{LOAD}$.

Still referring to FIGS. 6a, 6b, 6c, 6d, and 6e, at time $t_0$ controller 12A operates in the continuously pulsing PWM mode, thus inductor current $I_{24}$ is continuous and load current $I_{LOAD}$ is high. Timer 104 is reset at each cycle by PWM pulse $V_{PWM}$ appearing at the output terminal of PWM controller 50. Thus, signal Time_Out generated by timer 104 remains at a logic high voltage level and switch 102 is closed, i.e., transistor 109 is on. Under this condition, feedback network 54A is operating in a closed loop configuration and output signal $V_{COMP}$ of error amplifier 56 and voltage signal $V_{COMP1}$ appearing at the input of switch 102 are at substantially the same voltage level. Signal $V_{COMP}$ is referred to as a feedback loop output signal.

At time $t_1$, a load release occurs, i.e., the load changes from a heavy load to a light load, so that the energy stored in inductor 24 charges capacitor 26. In response to the change in output voltage $V_{OUT}$, voltage $V_{COMP}$ from error amplifier 56 decreases to a logic zero voltage and PWM controller 50 outputs a logic low voltage level which prevents overshoot in output voltage $V_{OUT}$. Inductor current $I_{24}$ decreases and power supply system 100 enters into the pulse skipping mode. Because there are no more PWM pulses ($V_{PWM}$) after timer 104 is reset at time $t_0$, time out signal Time_Out that appears at the output terminal of timer 104 at time $t_2$ is valid for a predetermined period of time, $T_{timer}$.

After time $t_2$, switch 102 is open, i.e., when switch 102 is implemented using transistor 109, transistor 109 is turned off. Under this condition feedback network 54A is operating in an open loop configuration which changes feedback loop output signal $V_{COMP}$. It should be noted that in the open loop configuration, error amplifier 56 operates as a comparator. Because output voltage $V_{OUT}$ is higher than reverence voltage $V_{REF}$, output signal $V_{COMP}$ from error amplifier 56 remains in a low saturation level. Voltage $V_{COMP1}$ appearing at node 105 rises and settles at a voltage level that is substantially the same as voltage $V_{BIAS}$, which is close to the DC voltage level of voltage signal $V_{COMP}$ in the steady-state continuously pulsing mode of operation.

During the time period from time $t_2$ to time $t_5$, load current $I_{LOAD}$ is very low and it discharges output capacitor 26 which slowly decreases output voltage $V_{OUT}$.

At time $t_3$, output voltage $V_{OUT}$ crosses over reference voltage $V_{REF}$ and voltage $V_{COMP}$ from error amplifier 56 increases triggering PWM controller 50 to generate a PWM pulse, which resets timer 104. Resetting timer 104 closes switch 102, e.g., if switch 102 is realized by transistor 109, resetting timer 104 turns on transistor 109. Because the load is small, the energy from a single PWM pulse is sufficient to maintain output voltage $V_{OUT}$ at a higher level than reference voltage $V_{REF}$.

At time $t_4$, signal Time_Out becomes valid again and switch 102 opens, e.g., transistor 109 turns off.

At time $t_5$, when a load step-up signal occurs after a silent period, error amplifier 56 operates like a comparator and quickly generates output signal $V_{COMP}$ at a logic high voltage level.

At time $t_6$, PWM controller 50 generates a PWM pulse that resets timer 104. After time $t_6$, PWM controller 50 continuously outputs PWM pulses to provide energy to load 36 and switch 102 remains closed, e.g., transistor 109 remains on.

FIGS. 7a, 7b, 7c, 7d, and 7e are plots that illustrate various signals that are generated by controller 12A when it operates in a continuous operating mode. The abscissas of plots 7a, 7b, 7c, 7d, and 7e indicate time and the ordinates of plots 7a, 7b, 7c, and 7d indicate voltage, whereas the ordinate of plot 7e indicates current. More particularly, plot 7a illustrates the voltage $V_{COMP}$ at node 57 and voltage $V_{COMP1}$ at node 105; plot 7b illustrates signal Time_Out; plot 7c illustrates the output voltage $V_{OUT}$ appearing between output 18 and terminal 16; plot 7d illustrates the voltage $V_{SWN}$ appearing at node 25; and plot 7e illustrates inductor current $I_{24}$. In FIG. 7, controller 12A operates in the continuously pulsing PWM mode, thus inductor current $I_{24}$ is continuous. Under this condition, operational amplifier 56 does not operate in saturation and there is little change in the DC bias of the capacitors of resistor capacitor network 62, i.e., capacitors 64 and 68. More particularly, during the steady state continuously pulsing operation, the DC bias across capacitor 68 is substantially equal to the difference between the average voltage level at the output terminal of error amplifier 56 during a continuously pulsing mode of operation and reference voltage $V_{REF}$ that appears at the non-inverting input terminal.

When there is a step-up load transience, voltage $V_{COMP}$ increases back to a value that is substantially equal to the average voltage level at the output terminal of error amplifier 56. FIGS. 8a, 8b, 8c, 8d, and 8e are plots that illustrate various signals that are generated by controller 12A when there is a step-up load transience and converter 12A has been operating in a skip mode, i.e., the skip mode is enabled. The abscissas of plots 8a, 8b, 8c, 8d, and 8e indicate time and the ordinates of plots 8a, 8b, 8c, and 8d indicate voltage, whereas the ordinate of plot 8e indicates current. More particularly, plot 8a illustrates the voltage $V_{COMP}$ at node 57 and voltage $V_{COMP1}$ at node 105; plot 8b illustrates voltage Time_Out; plot 8c illustrates the output voltage $V_{OUT}$ appearing between output 18 and terminal 16; plot 8d illustrates the voltage $V_{SWN}$ appearing at node 25; and plot 8e illustrates inductor current $I_{24}$. It should be noted that in accordance with embodiments of the present invention, power supply system 100 has a faster response than power supply system 10 under both continuous mode operation and skip mode operation because error amplifier 56 does not need to trip with the whole feedback network 54A from the saturation level, i.e., the feedback network behaves as the load of error amplifier 56, and there is no large DC bias changing in compensation capacitors 64 and 68.

Figure 9:
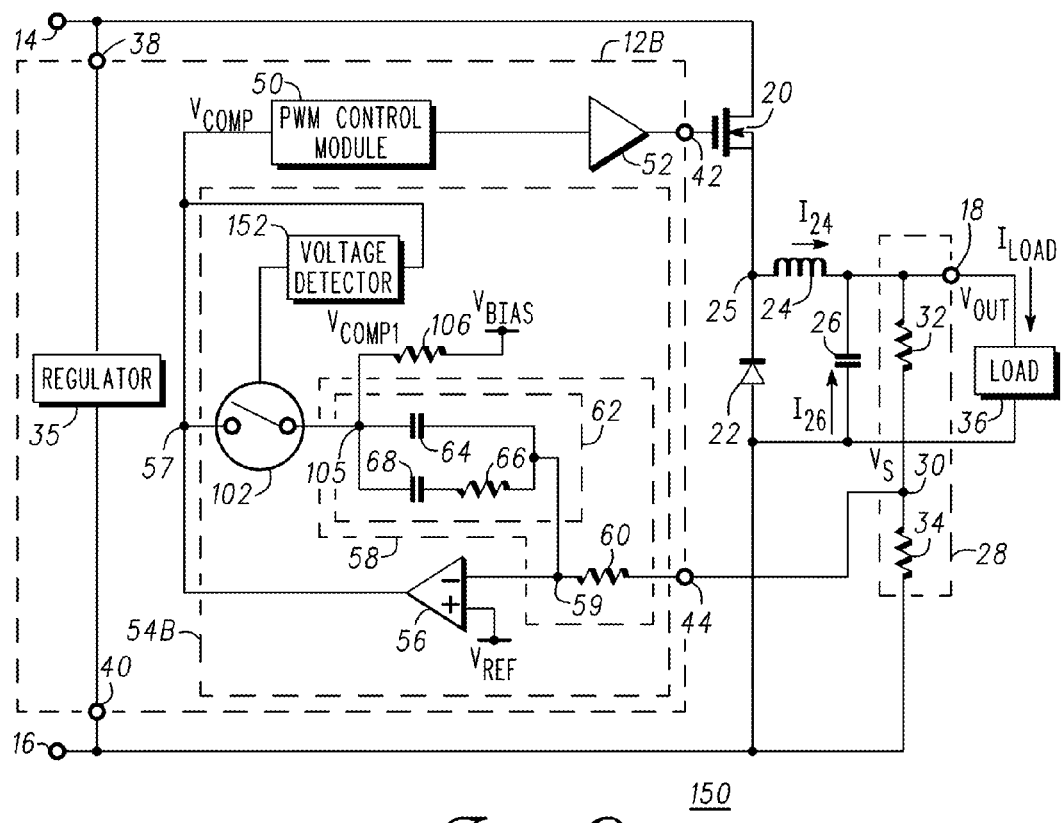
FIG. 9 is a circuit schematic of a portion of a power supply control system in accordance with another embodiment of the present invention.

FIG. 9 is a schematic diagram of a portion of a power supply system 150 in accordance with another embodiment of the present invention. Power supply system 150 includes a switching power supply controller 12B, voltage sense network 28, power transistor 20, rectifier 22, and inductor 24. Switching power supply controller 12B is similar to switching power supply controller 12A except that controller 12B includes a feedback network 54B that has a voltage detection network or voltage detector 152 having an input terminal connected to the output terminal of error amplifier 56 and an output terminal connected to the control terminal of switch 102 rather than a timer 104. Thus, timer 104 is not present in feedback network 54B. Switch 102 is connected between the output compensation network 62 and the commonly connected output terminal of error amplifier 56 and the input terminal of PWM control module 50 at node 57.

In operation, voltage detector 152 monitors the voltage level of error signal $V_{COMP}$ and controls switch 102. Once error amplifier 56 enters the saturation range, voltage detector 152 opens switch 102, e.g., turns off transistor 109, thereby disconnecting compensation network 58 from node 57 and when the voltage level of error signal $V_{COMP}$ is in the normal range compensation network 58 is re-connected to node 57.

Although specific embodiments have been disclosed herein, it is not intended that the invention be limited to the disclosed embodiments. Those skilled in the art will recognize that modifications and variations can be made without departing from the spirit of the invention. For example, the switching network can be used with other types of converters such as, for example, boost converters, buck-boost converters, etc. It is intended that the invention encompass all such modifications and variations as fall within the scope of the appended claims.

What is claimed is:

1. A power supply controller, comprising:
   a pulse width modulation control module having an input and an output; and
   a feedback network having a first input and an output, the output connected to the input of the pulse width modulation control module, wherein the feedback network includes:
   an amplifier having an inverting input terminal, a non-inverting input terminal, and an output terminal;
   a compensation network having first and second nodes; and
   a switch having first and second current conducting terminals and a control terminal, the first current conducting terminal coupled to the first node of the compensation network and the second current conducting terminal coupled to the output terminal of the amplifier and to the input of the pulse width modulation control module, and the control terminal coupled to the output of the pulse width modulation control module, wherein the feedback network operates in an open loop configuration in response to the switch being open and in a closed loop configuration in response to the switch being closed.

2. The power supply controller of claim 1, further including a timer having an input coupled to the output of the pulse width modulation control module and an output coupled to the control terminal of the switch.

3. The power supply controller of claim 2, further including a bias voltage coupled to the first terminal of the switch.

4. The power supply controller of claim 3, further including a first resistor, wherein the bias voltage is coupled to the first terminal of the switch through the resistor.

5. The power supply controller of claim 1, further including a voltage detector having an input and an output, the input coupled to the output terminal of the amplifier and the output coupled to the control terminal of the switch.

6. The power supply controller of claim 5, further including a bias voltage coupled to the first terminal of the switch.

7. The power supply controller of claim 6, further including a first resistor, wherein the bias voltage is coupled to the first terminal of the switch through the resistor.

8. The power supply controller of claim 1, further including a first resistor having a terminal coupled to the inverting input terminal of the amplifier and to the first node of the compensation network.

9. The power supply controller of claim 1, wherein the switch comprises a field effect transistor having a control terminal and first and second current conducting terminals.

10. The power supply controller of claim 9, further including a first capacitor coupled between the first and second current conducting terminals.

11. The power supply controller of claim 1, further including a bias voltage coupled to the first terminal of the switch, wherein the bias voltage is substantially equal to the average value of the output signal of the amplifier in response to the power supply controller operating in a steady state continuously pulsing mode.

12. A method for improving a transient response of a controller, comprising:
   generating a first signal;
   using the first signal to generate a feedback loop output signal by operating a compensation network in a closed loop configuration and using a voltage detector to monitor the feedback loop output signal; and
   changing the feedback loop output signal by operating the compensation network in an open loop configuration in response to an error amplifier entering a saturation range and operating the compensation network in a closed loop configuration in response to the feedback loop output signal being in its nominal range.

13. The method of claim 12, further including generating the feedback loop output signal when a switch is in a closed configuration.

14. The method of claim 13, further including turning on a transistor to close the switch.

15. The method of claim 12, further including changing the feedback loop output signal by opening the switch.

16. The method of claim 15, further including turning off a transistor to open the switch.

17. A method for improving a transient response of a controller, comprising:
   generating a first signal;
   using the first signal to generate a feedback loop output signal by operating a compensation network in a closed loop configuration; and
   changing the feedback loop output signal by operating the compensation network in an open loop configuration and starting a timer after it has been reset by the first signal where the timer has a timing period that is longer than at least one critical conduction mode switching cycle of the first signal.

18. The method of claim 17, further including resetting the timer in response to a second voltage being greater than a reference voltage.

19. The method of claim 18, wherein resetting the timer closes a switch and places the compensation network in the closed loop configuration.

20. The method of claim 12, further including generating the feedback loop output signal in response to the controller operating in a continuously pulsing mode and changing the feedback loop output signal by operating the controller in a pulse skip operating mode.

* * * * *